O. O. BYRD.
CAR BRAKE.
APPLICATION FILED JUNE 29, 1912.
1,073,390.
Patented Sept. 16, 1913.
2 SHEETS—SHEET 1.
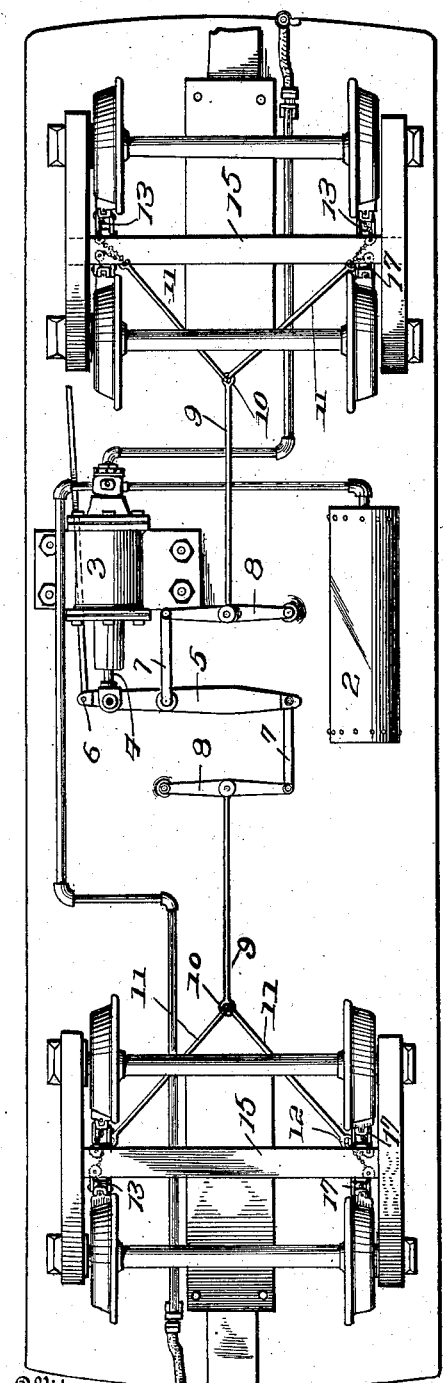
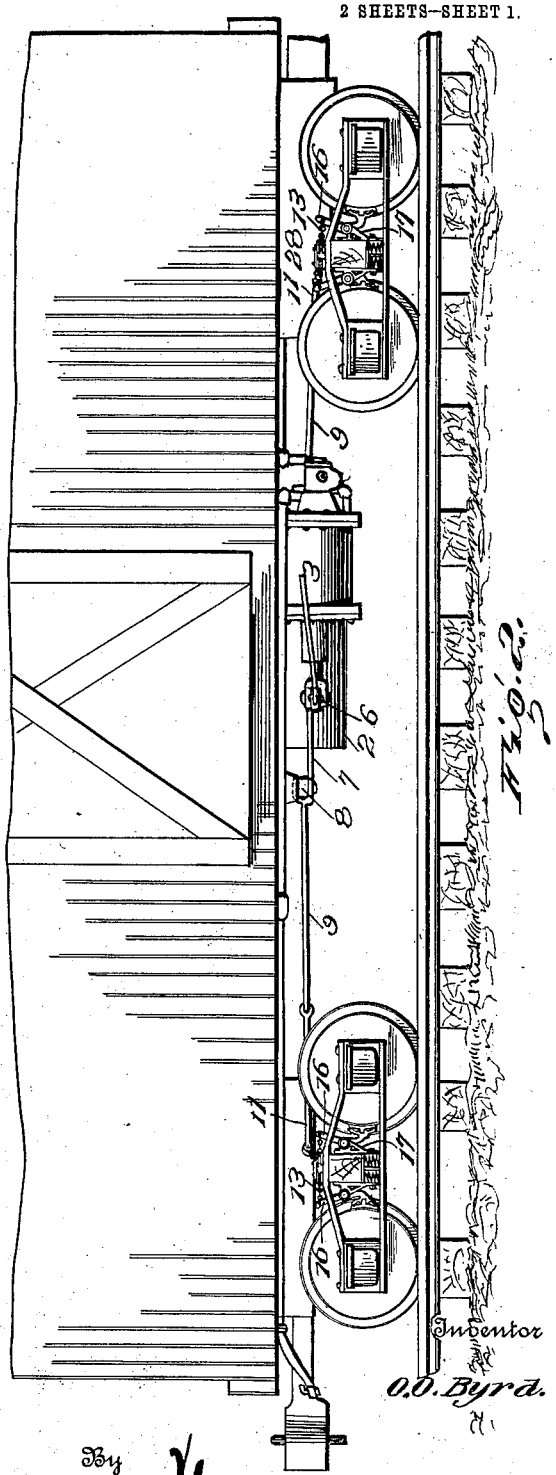
Witnesses
Inventor
O. O. Byrd.
By
Attorneys.

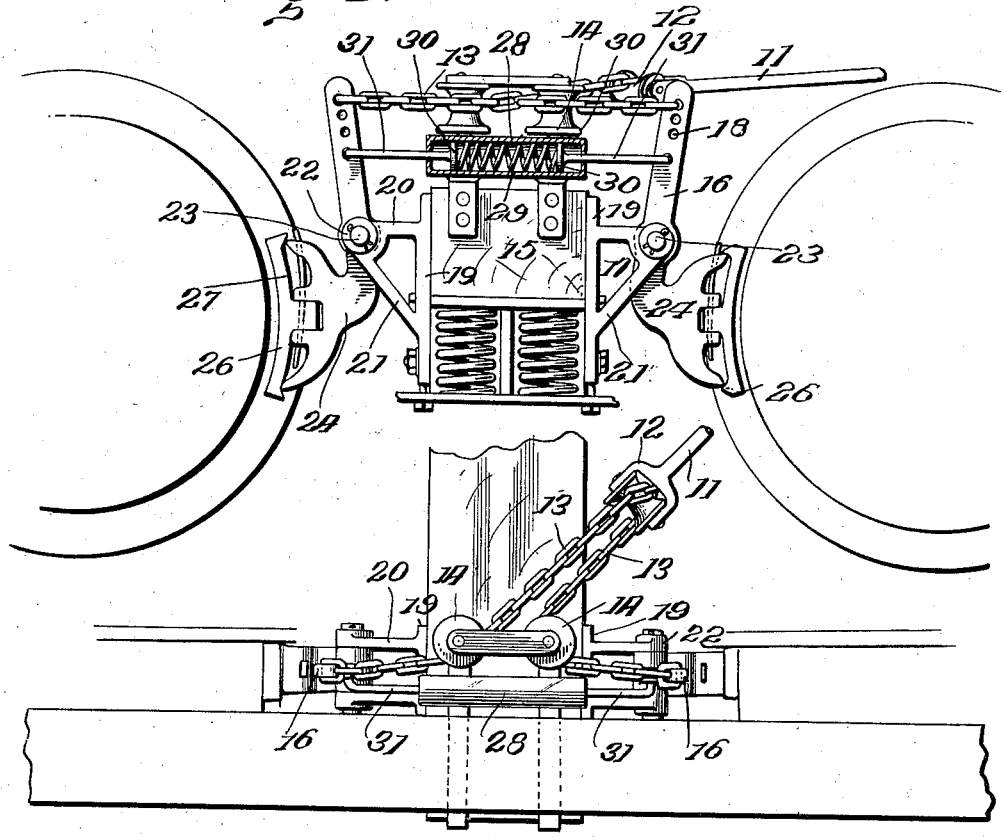

UNITED STATES PATENT OFFICE.

OSCAR O. BYRD, OF SLATER, MISSOURI, ASSIGNOR OF ONE-FOURTH TO SAMUEL F. WHITTAKER AND ONE-FOURTH TO SALLIE F. WHITTAKER, OF PRESCOTT, ARIZONA, AND ONE-HALF TO JAMES W. THOMPSON, OF NEW ORLEANS, LOUISIANA.

CAR-BRAKE.

1,073,390.  Specification of Letters Patent.  Patented Sept. 16, 1913.

Application filed June 29, 1912. Serial No. 706,805.

*To all whom it may concern:*

Be it known that I, OSCAR O. BYRD, citizen of the United States, residing at Slater, in the county of Saline and State of Missouri, have invented certain new and useful Improvements in Car-Brakes, of which the following is a specification.

This invention has for its object the provision of a car brake, the parts of which will be simple in their construction and arrangement, easily operated to effectually apply the brake shoes to the car wheels and quickly released therefrom when the holding force is removed.

The invention is illustrated in the accompanying drawings and consists in certain novel features which will be particularly pointed out in the claims following the description hereinafter given.

In the drawings:—Figure 1 is a bottom plan view of a freight car equipped with my improved brake; Fig. 2 is a side elevation of the same; Fig. 3 is an enlarged elevation of the brake shoes and parts immediately adjacent thereto; Fig. 4 is an enlarged plan view of the parts shown in Fig. 3.

The freight car, 1, may be of any well-known type and is shown in the drawings for illustrative purposes only in order that the nature of my improvements may be more readily understood. Upon the bottom of the car is provided the usual reservoir, 2, and brake cylinder, 3, connected therewith in the usual manner to permit the application of air under pressure to the operating parts of the brake. The piston within the cylinder 3 has its rod 4 extended from the cylinder and pivoted to a lever 5 which is provided at its end with an eye 6 for the attachment of a rod running to the usual hand wheel to permit the application of the brake by hand power.

To the lever 5 are pivotally attached connecting rods 7 which extend in opposite directions from the lever 5 and are pivoted to the free ends of fulcrum levers 8 which are fulcrumed at the ends opposite the said connecting rods to the bottom of the car. These fulcrum levers 8 extend in opposite directions from their respective connecting rods 7, and the brake rods 9 are pivoted to the said fulcrum levers at about the centers thereof so that the two brake rods extending toward the opposite ends of the car will be brought into the medial longitudinal line of the car. The outer ends of the brake rods 9 are formed into eyes or clevises 10 to which are connected links 11 which diverge from the respective brake rods toward the opposite ends of the adjacent truck and have their outer ends equipped with pulleys 12 around which pass the chains 13. These chains 13 pass from the pulleys 12 between guide rollers or pulleys 14 which are mounted upon the upper side of the bolster or truck beam 15, as clearly shown in Figs. 3 and 4. The chains pass around the said guide rollers or pulleys 14 and then extend in opposite directions to the brake levers 16 which are fulcrumed in suitable brackets 17 secured to the opposite sides of the beam or bolster 15, as clearly shown. The upper ends of the brake levers 16 are provided with longitudinal series of openings 18, in any one of which the ends of the chains 13 may be engaged so that the leverage may be adjusted to the wear of the brake shoes or any other conditions.

The supporting brackets 17, in which the brake levers are mounted, consist of standards or securing portions 19 rigidly fastened to the side of the beam or bolster, outstanding arms 20 near the upper ends of said standards 19, and braces 21 rising from the said standards 19 to the said supporting arms 20 and merging into said arms through eyes or bearings 22 formed at the junction therewith. Fulcrum pins 23 are inserted through the said bearings and the brake levers to pivotally secure the levers in the brackets, and the lower ends of the brake levers are turned outwardly, as shown at 24, to engage lugs 25 formed on the backs of the brake shoes 26, keys 27 being inserted through the said lugs and the ends of the respective brake levers to secure the brake shoes to the levers.

Upon the upper side of the bolster or truck beam 15, I secure a cylindrical housing 28 containing a coiled spring 29 disposed between pistons 30 having their rods 31 extending through the adjacent ends of the housing and pivotally attached to the brake levers, as shown.

Pressure being applied to the lever 5 either by hand or by means of compressed air within the brake cylinder 3, the said lever will be swung upon its fulcrum so as to pull upon the connecting rods 7 and thereby swing the fulcrum levers 8 about their fulcrums so that the brake rods 9 will be drawn inwardly relative to the ends of the car. The movement of the brake rods 9 will be imparted directly to the links 11 so that the chains 13 will be drawn toward the central longitudinal line of the car and thereby act upon the upper ends of the brake levers 16 so as to swing the said levers about their fulcrums and force the brake shoes against the car wheels. When the brake levers are thus actuated the pistons 30 will be moved toward each other within the housing 28 so that the spring 29 will be compressed, and when the holding force upon the lever 5 is removed the said spring will at once expand and force the pistons 30 outwardly so that the brake levers will be swung about their fulcrums in the opposite directions to release the brake shoes from the wheels. It will thus be seen that the release of the brakes will be accomplished instantly, so that the wear upon the brake shoes will be minimized, and it will also be noted that the arrangement of the parts is such as to obtain a direct application of power to the brake levers and cause their positive simultaneous operation.

The apparatus is composed of very few parts which are simple in their construction and compact in their arrangement, so that the liability of the brake getting out of order is greatly reduced.

What I claim is:—

1. In a car brake, the combination of a support, brake levers fulcrumed upon the opposite sides of said support, guide rollers on the support between the upper ends of the brake levers, brake rods mounted upon the car body, means for moving said brake rods longitudinally, links pivoted to the outer ends of the brake rods and diverging therefrom, and flexible connections between the upper ends of the brake levers, said connections passing between and around the said guide rollers and loosely supported by the outer ends of the links.

2. In a car-brake, the combination of a support, brake levers fulcrumed upon the opposite sides of said support, guide rollers on the support between the upper ends of the brake levers, brake rods mounted upon the car body, means for moving said brake rods longitudinally, links pivoted to the outer ends of the brake rods and diverging therefrom, rollers carried by the outer ends of the links, and flexible connections trained around the said rollers and passing therefrom between and around the guide rollers and secured to the upper ends of the brake levers.

In testimony whereof I affix my signature in presence of two witnesses.

OSCAR O. BYRD. [L. S.]

Witnesses:
C. O. GRIFFIS,
E. B. PARKS.

Copies of this patent may be obtained for five cents each, by addressing the "Commissioner of Patents, Washington, D. C."